US012623637B2

(12) United States Patent
Wilson et al.

(10) Patent No.: US 12,623,637 B2
(45) Date of Patent: May 12, 2026

(54) VEHICLE DISPLAY SYSTEMS AND METHODS

(71) Applicant: United Auto Delivery and Recovery, Inc., Colliersville, TN (US)

(72) Inventors: Kevin Wilson, Memphis, TN (US); Brad Huddleston, Lakeland, TN (US); Brandon Derrick, Germantown, TN (US); Paul Rettenmaier, Leawood, KS (US); Marianne Simshauser, Collierville, TN (US); Todd Richardson, Memphis, TN (US)

(73) Assignee: United Auto Delivery and Recovery, Inc., Collierville, TN (US)

( * ) Notice: Subject to any disclaimer, the term of this patent is extended or adjusted under 35 U.S.C. 154(b) by 226 days.

(21) Appl. No.: 18/623,628

(22) Filed: Apr. 1, 2024

(65) Prior Publication Data

US 2024/0383450 A1    Nov. 21, 2024

Related U.S. Application Data

(60) Provisional application No. 63/466,940, filed on May 16, 2023.

(51) Int. Cl.
*B60S 13/02*        (2006.01)
*G06Q 30/08*        (2012.01)
(52) U.S. Cl.
CPC ............. *B60S 13/02* (2013.01); *G06Q 30/08* (2013.01)

(58) Field of Classification Search
CPC ........... B60S 13/02; G06Q 30/08; E04H 3/26; E04H 3/28; E04H 6/08; E04H 6/426; E04H 6/10
(Continued)

(56) References Cited

U.S. PATENT DOCUMENTS

| 1,639,230 A | * | 8/1927 | Macdonald, Jr. ..... B66B 11/006 104/44 |
| 3,115,684 A | * | 12/1963 | Joy ........................... E04H 3/26 52/64 |

(Continued)

FOREIGN PATENT DOCUMENTS

| CN | 212326002 U | 1/2021 |
| CN | 212698351 U | 3/2021 |

(Continued)

*Primary Examiner* — Brian E Glessner
*Assistant Examiner* — Adam G Barlow
(74) *Attorney, Agent, or Firm* — Butler Snow LLP; Jon E. Holland

(57)        ABSTRACT

A vehicle auction facility has a plurality of turntables on which vehicles may be displayed for auction. Each turntable is associated with at least one doorway through which a line of vehicles may drive onto and off the turntable one at a time. Once a vehicle is driven onto the turntable, the turntable may rotate the vehicle as it is being auctioned. Such rotation may position the vehicle for exiting the facility through the same doorway in which it entered while the next vehicle in the same line of vehicles is being driven to the turntable. Thus, vehicles can be quickly showcased and auctioned while avoiding many safety concerns and collision risks. In addition, the plurality of turntables can be arranged in a curved fashion so that bidders in a central area of the facility can clearly see several vehicles being auctioned at the same time.

23 Claims, 17 Drawing Sheets

(58) Field of Classification Search
USPC ................................................ 52/7, 33, 174
See application file for complete search history.

(56) References Cited

U.S. PATENT DOCUMENTS

| | | | | |
|---|---|---|---|---|
| 5,469,676 A * | 11/1995 | Colsman | ................. | E04H 6/285 |
| | | | | 52/65 |
| 5,626,079 A * | 5/1997 | Summers | ................. | A47F 5/025 |
| | | | | 104/44 |
| 5,755,160 A * | 5/1998 | Blufordcraving | ....... | B60S 13/02 |
| | | | | 104/44 |
| 6,817,300 B2 * | 11/2004 | Schwenker | ................. | B61J 1/02 |
| | | | | 104/44 |
| 6,877,437 B2 * | 4/2005 | Murdock | ................. | B60S 13/02 |
| | | | | 104/35 |
| 9,691,100 B2 * | 6/2017 | Wolfsen | ................. | G06Q 30/08 |
| 11,407,386 B2 * | 8/2022 | Mondro | ................. | B60S 13/02 |
| 2008/0127574 A1 * | 6/2008 | Yi | ............................ | E04H 6/10 |
| | | | | 381/78 |
| 2010/0018136 A1 * | 1/2010 | Morasch | ................... | E04H 6/42 |
| | | | | 52/174 |
| 2013/0202391 A1 * | 8/2013 | Dezer | ....................... | E04H 6/22 |
| | | | | 414/231 |
| 2016/0237713 A1 * | 8/2016 | Dezer | ....................... | E04H 6/40 |
| 2017/0039635 A1 * | 2/2017 | Wolfsen | ................ | G06Q 30/08 |
| 2017/0287063 A1 * | 10/2017 | Wolfsen | ................ | G06Q 30/08 |
| 2025/0327322 A1 * | 10/2025 | Dell | .......................... | E04H 3/24 |

FOREIGN PATENT DOCUMENTS

| | | | |
|---|---|---|---|
| CN | 218960426 U | 5/2023 |
| FR | 3104186 A1 | 11/2022 |
| WO | 199502741 A1 | 1/1995 |
| WO | 2014102342 A2 | 7/2014 |

* cited by examiner

VEHICLE DISPLAY SYSTEMS AND METHODS

CROSS REFERENCE TO RELATED APPLICATION

This application claims priority to U.S. Provisional Patent Application No. 63/466,940, entitled "Vehicle Display Assembly," and filed on May 16, 2023, which is incorporated herein by reference.

RELATED ART

Vehicles are typically auctioned at large facilities having rows of several parallel lanes through which vehicles (e.g., cars, trucks, etc.) are driven. At each lane, there is often an auction block where an auctioneer calls out and takes bids from bidders attending the auction. The vehicle being auctioned in a given lane is typically driven down the lane and stopped near the auction block so bidders at or near the auction block can see the vehicle as bids are taken.

The floor at an auction can be chaotic and loud with multiple auctions occurring at the same time over several lanes. A bidder at one lane often is unable to see the vehicle being auctioned at another lane, particularly as the distance between the lanes of interest increases, thereby making it difficult for the bidder to know when vehicles of interest across multiple lanes are being offered.

If a bidder at one lane wishes to bid on a vehicle auctioned at another lane, the bidder typically must walk across one or more lanes to the lane at which the vehicle of interest is being auctioned. Noting that auctions can be attended by large numbers of bidders, such as hundreds or even thousands of bidders, the environment at an auction facility is often dangerous with people and cars frequently moving through and across the lanes at unpredictable times. A malfunctioning vehicle, such as a vehicle with a stuck throttle, can be particularly dangerous to unsuspecting bidders crossing the lanes. In addition, the difficulty in seeing vehicles being auctioned in multiple lanes may cause confusion as to when a vehicle of interest is being auctioned. Indeed, some bidders may frequently cross lanes in search of vehicles of interest and, in some cases, run across lanes without taking adequate safety precautions to avoid vehicles that may be moving in the lanes.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to vehicle display systems and methods for displaying vehicles at auctions. In some embodiments of the present disclosure, a vehicle auction facility has a plurality of turntables on which vehicles may be displayed for auction. Each turntable is associated with at least one doorway through which a line of vehicles may drive onto and off the turntable one at a time. Once a vehicle is driven onto the turntable, the turntable may be configured to rotate, thereby rotating the vehicle as it is being auctioned. Such rotation may position the vehicle for exiting the facility through the same doorway in which it entered. In some embodiments, the vehicle is positioned at an angle so that it may exit the facility while the next vehicle in the same line of vehicles is being driven to the turntable. Thus, vehicles can be quickly showcased and auctioned while avoiding many of the safety concerns plaguing conventional auction sites. In addition, the plurality of turntables can be arranged in a curved fashion so that bidders in a central area of the facility can clearly see several vehicles being auctioned at the same time.

Figure 1:
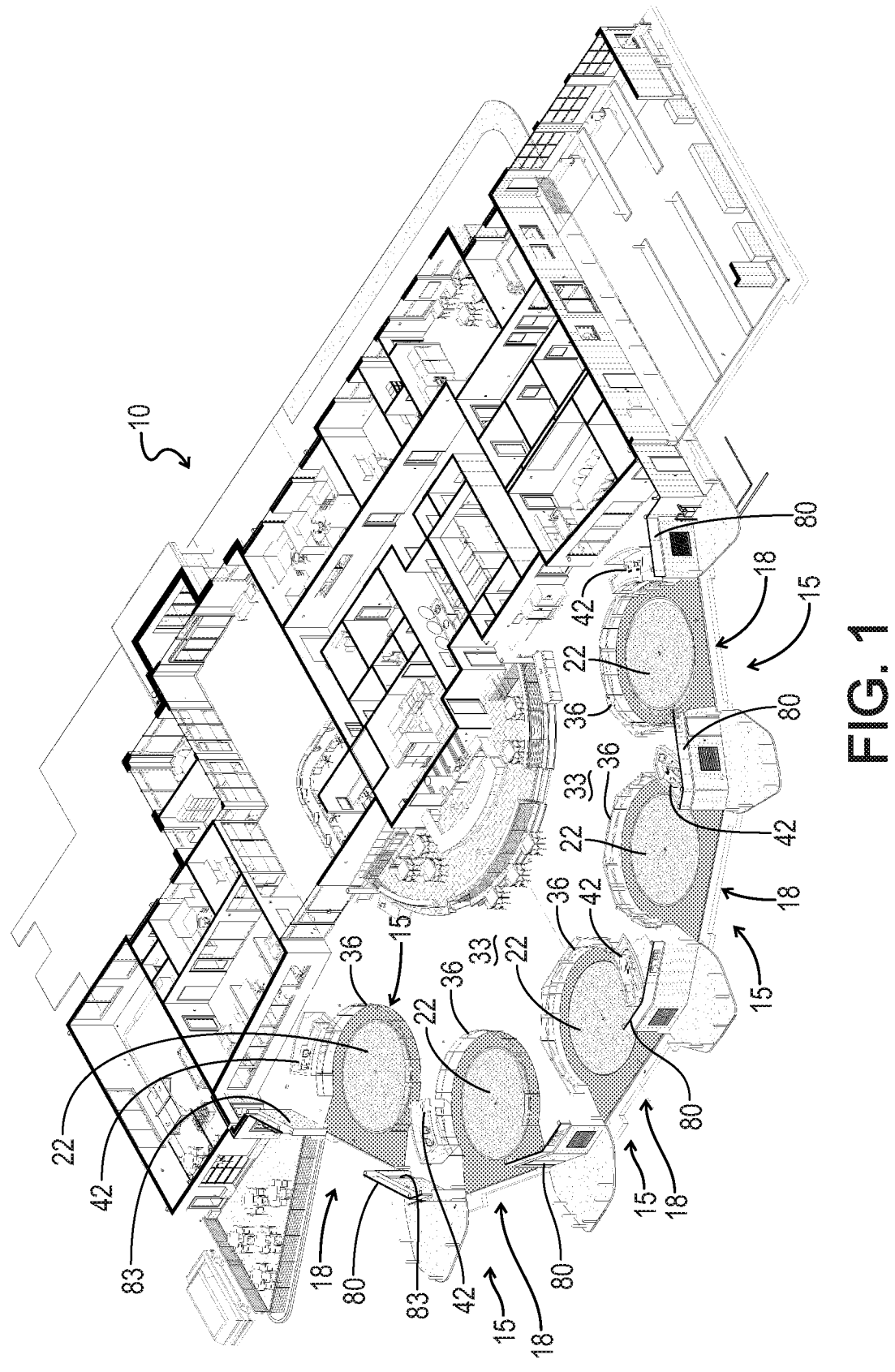
FIG. 1 depicts an embodiment of a facility having a system for auctioning vehicles.

FIG. 1 depicts an embodiment of a facility 10 for use in auctioning vehicles. As shown by FIG. 1, the facility 10 has a plurality of auction bays 15 at which vehicles may be auctioned. The facility 10 shown by FIG. 1 has five auction bays 15, but the facility 10 may have any number of auction bays 15 in other embodiments.

Figure 2:
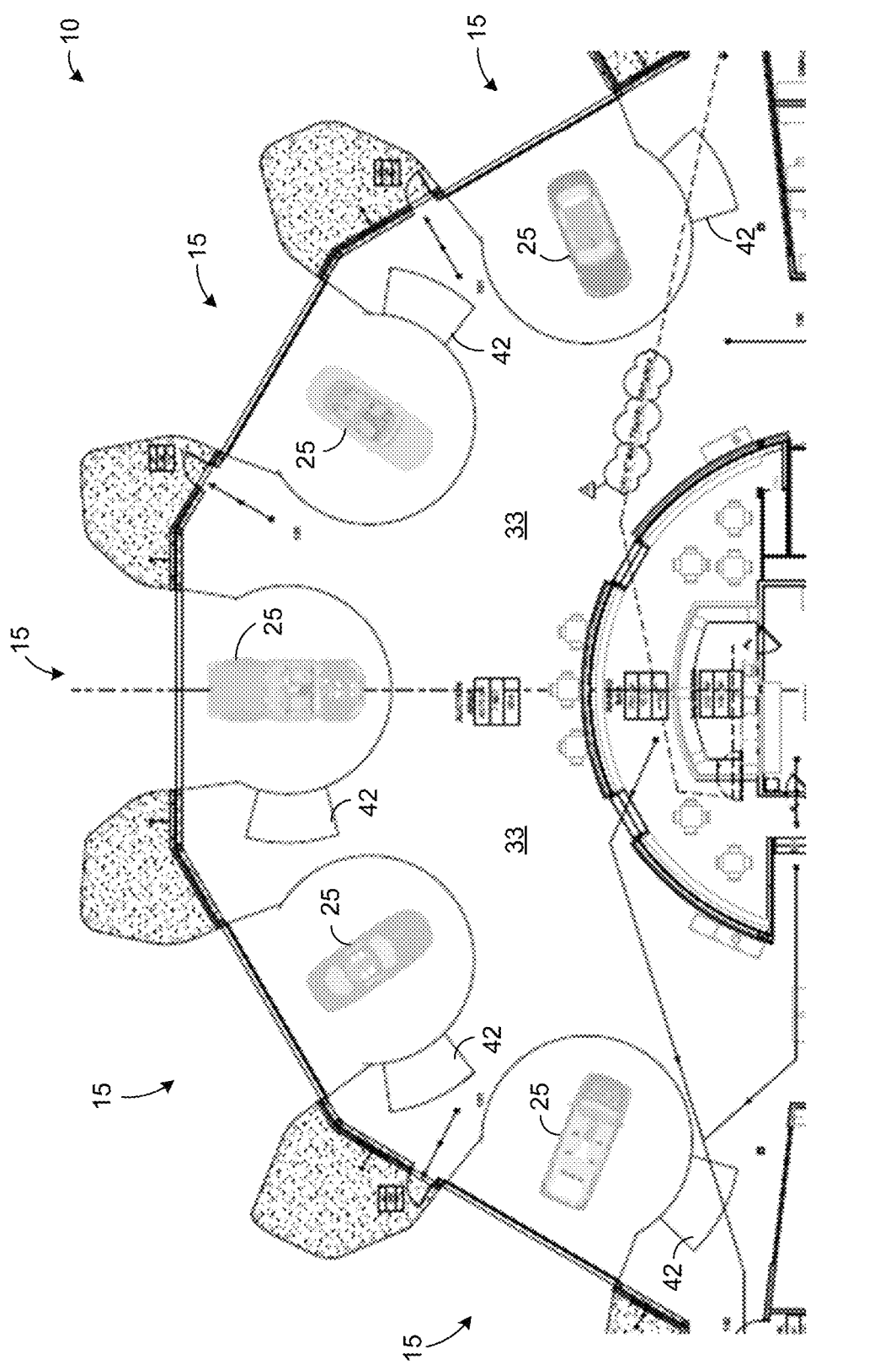
FIG. 2 is a top view illustrating a plurality of auction bays in a facility, such as is depicted by FIG. 1.

Each auction bay 15 has a turntable 22 on which a vehicle 25 (FIG. 2) may be positioned during auctioning of the vehicle 25. Bidders interested in purchasing any of the vehicles 25 may be located in a central bidding area 33 within the facility 10. While a vehicle 25 on a turntable 22 is being auctioned, the turntable 22 may rotate, thereby rotating the vehicle 25, such that bidders in the bidding area 33 may see the vehicle 25 from different angles as it rotates.

Each auction bay 15 also has at least one doorway 18 through which vehicles 25 may enter and exit the auction bay 15. In some embodiments, there is a single doorway 18 for both ingress and egress of vehicles, although it is possible for multiple doorways to be used. Note that the use of a single doorway 18 for both ingress and egress may facilitate entry and exit of the vehicles 25 with less risk of collision with a wall, such as a wall that may be separating multiple doorways for the same bay 15 in embodiments for which multiple doorways are used rather than a single doorway.

As shown by FIG. 1, each auction bay 15 has a barrier 36 that physically separates the auction bay 15 and, in particular, the bay's turntable 22 from the bidding area 33, thereby preventing bidders from entering the area of the turntable 22 where they could be struck by a vehicle 25 as it is being driven onto or off the turntable 22. In some embodiments, each barrier 36 comprises guardrails, but other types of barriers (e.g., walls) may be used in other embodiments. The height of each barrier 36 may be sufficiently high (e.g., at least around three feet) to prevent or discourage bidders from crossing the barrier 36, but the height may also be kept sufficiently low so as not to obstruct the bidders' views of the vehicle 25. If desired, transparent material may be used, and it is possible for barriers 36 of other sizes and configurations to be used.

In some embodiments, each barrier 36 is reinforced to withstand the impact of a vehicle 25 in case the vehicle 25 is inadvertently driven into the barrier 36 by a negligent driver or in the event that the vehicle 25 malfunctions, such as a vehicle 25 with a stuck throttle. Specifically, each barrier 36 may be designed to prevent a vehicle 25 from entering the bidding area 33 to protect the bidders in such area 33.

Figure 3:
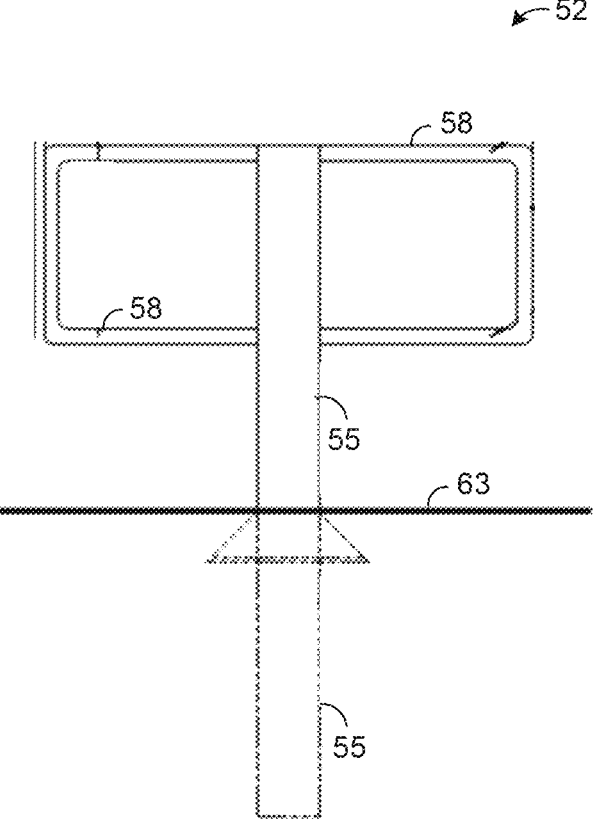
FIG. 3 depicts an embodiment of a section of a barrier for an auction bay, such as is depicted by FIG. 1.

FIG. 3 shows an embodiment of a section 52 of a barrier 36. The barrier section 52 comprises a bollard 55 that is inserted through the floor 63 of the facility 10. The bollard 55 may be composed of a high-strength material, such as a steel, and in some embodiments, the bollard 55 may be designed to be removable by lifting on the bollard to pull it out of the floor 63. In some embodiments, the bollard 55 may be filled with concrete to provide additional reinforcement. Further, as shown by FIG. 3, one or more guardrails 58 may be mounted on the bollard 55 to help prevent bidders from passing between sections 52. Such guardrails 58 may also be composed of a high-strength material, such as steel. Various other configurations of the section 52, including the bollard 55 are possible. For example, rather than passing through the floor 63, the bollard 55 may be bolted or otherwise coupled to the floor 63.

Figure 4:
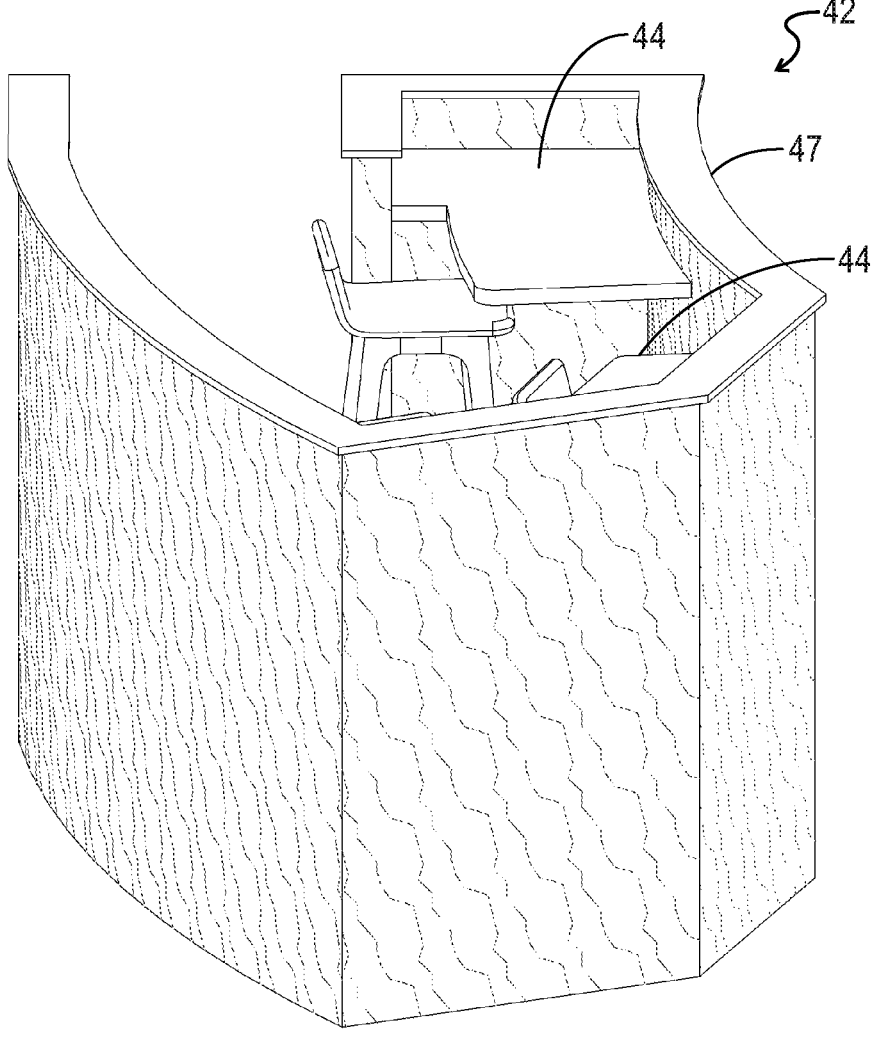
FIG. 4 depicts an embodiment of an auction block for an auction bay, such as is depicted by FIG. 1.

As shown by FIG. 1, each auction bay 15 has a structure 42, referred to herein as an "auction block." FIG. 4 shows an embodiment of an auction block 42 in more detail. During an auction, an auctioneer may be in the auction block 42 and call out and receive bids for the vehicle 25 being auctioned at the respective auction bay 15. As shown by FIG. 4, the auction block 42 has one or more tables 44 for use by the auctioneer and/or other users, such as a clerk who may be tasked with recording bids and sales. As shown by FIG. 4, at least one of the sidewalls 47 of the auction block 42 is curved in order to accommodate the bay's turntable 22. For example, the radius of curvature of the sidewall 47 may substantially match the radius of curvature of the turntable 22 at the sidewall 47.

Figure 5:
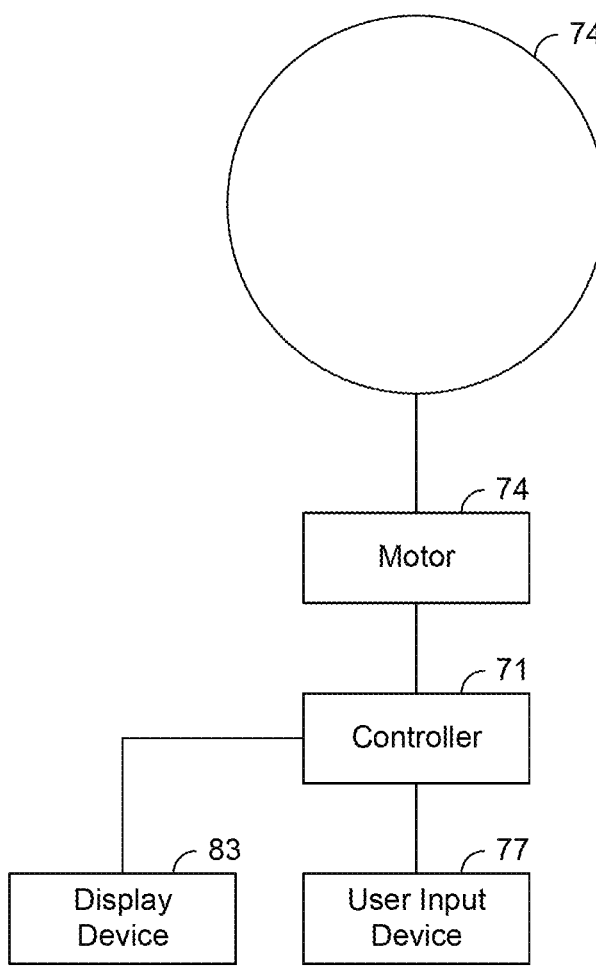
FIG. 5 is a block diagram illustrating an embodiment of a system for controlling a turntable of an auction bay, such as is depicted by FIG. 1.

Note that the turntable 22 of a given auction bay 15 may be configured to rotate under the control of a controller 71, as shown by FIG. 5. In this regard, the controller 71 may be coupled to a motor 74 for driving the turntable 22 and control the motor 74 such that it turns the turntable 22 as desired. The controller 71 may be any device, such as a computer (e.g., a desktop or laptop computer, a smartphone, or other known computing device) capable of communicating control signals or instructions. In some embodiments, the controller 71 comprises one or more processors (e.g., microprocessors) that execute instructions (e.g., software or firmware) stored in memory, but other types of controllers 71 are possible in other embodiments.

As shown by FIG. 5, the controller 71 is coupled to a user input device 77 for receiving input from a user. In one embodiment, the user input device 77 comprises at least one switch, such as a button, but other types of user input devices 77 (e.g., a keyboard, keypad, or mouse) may be used in other embodiments. As an example, the user input device 77 may be a handheld device, such as a smartphone, that can be carried by a user and communicate with the controller 71 wirelessly (e.g., via Bluetooth, Wi-Fi, or cellular signals). In some embodiments, the controller 71 and/or user input device 77 for a given auction bay 15 may be located at the bay's auction block 42. For example, the controller 71 may be implemented as a computer that may be used by the auctioneer or other user, in addition to controlling the turntable 22, to enter and track information related to the vehicles 25 being auctioned, the bidding process, and/or sales of the vehicles 25. In other embodiments, the controller 71 and/or the user input device 77 may reside at other locations. As an example, the controller 71 and/or user input device 77 may be mounted on a wall 80 of the facility 10, and in some embodiments, there may be multiple user input devices 77 positioned at various locations (e.g., on a wall 80 and on an auction block 42) to provide multiple locations at which users may provide inputs for controlling the turntable 22. In addition, a mobile device (e.g., a smartphone) may be used to receive inputs for controlling the turntable 22. Yet other configurations and techniques for controlling the turntable 22 are possible in other embodiments.

In some embodiments, the auctioneer at the auction block 42 or other user may use the user input device 77 to control when the turntable 22 begins rotating as part of an auctioning process for auctioning the vehicle 25 that is on the turntable 22. As an example, once a first vehicle 25 has been sold, the first vehicle 25 may be driven off the turntable 22 and a second vehicle 25 may driven onto the turntable for the next auction. While the second vehicle 25 is on the turntable 22, the auctioneer or other user may be finishing the sale of the first vehicle 25 (e.g., logging information about such sale, such as the identity of the winning bidder, the amount of the winning bid, etc.). When the auctioneer or other user is ready for the auction of the second vehicle 25 to commence, such auctioneer or other user may provide an input via the user input device 77 (e.g., activate a button or other type of switch of the user input device 77) to commence rotation of the turntable 22 for the auction of the second vehicle 25. Thus, the timing of the rotation is in the control of a user who may take into account various factors, including when the auctioneer is ready to begin the next auction. In other embodiments, other techniques may be used to commence rotation of the turntable 22.

Note that the rotation of the turntable 22 may be controlled by various predefined settings stored by the controller 71. For example, the rate of rotation and the rotation angle may be defined by such settings and used to control the motor 74. In some embodiments, for each auction, the turntable 22 is slowly rotated greater than 180 degrees (e.g., about 240 degrees) in order to facilitate entry and exit of vehicles 25 through the bay's doorway 18 while also providing bidders in the area 33 with a view of all sides of the vehicle 25, but other angles of rotation may be used in other embodiments. Once the turntable reaches the specified rotation angle, the controller 71 may be configured to automatically stop the rotation until rotation is again activated by a user, such as when the auction process for the next vehicle is to begin. Once rotation for the current auction is stopped, the vehicle 25 being currently auctioned may be driven off the turntable 22 when it is desirable to do so (e.g., after a winning bid is accepted), and the vehicle 25 for the next auction may be driven onto the turntable 22. As will be described in more detail hereafter, the layout of the auction bay 25 is such that a vehicle 25 may be driven onto the turntable 22 while (or immediately after) another vehicle 25 is being driven off the turntable 22, thereby minimizing the amount of time needed to transition from one auction to the next for the same bay 15.

Note that each auction bay 15 may have at least one controller 71 for controlling its respective turntable 22, as described above. However, it is possible that the same controller 71 may be used to control the turntables 22 of multiple auction bays 15 or even all the auction bays 15. Various configurations and techniques for controlling the turntables 22 are possible.

Referring to FIG. 1, each doorway 18 is defined by walls 80 of the facility 10 where each wall 80 is generally positioned behind a bay's auction block 42 from a perspective of a bidder in the bidding area 33. A display device 83 may be positioned on each such wall 80, as shown by FIG. 1, although other locations of the display device 83 are possible in other embodiments. For example, in some embodiment, a display device 83 may hang from the ceiling and be suspended over the turntable 22 such that the display device 83 is positioned directly over a vehicle 25 when it is positioned on the turntable 22. Yet other locations of the display device 83 for a given auction bay 15 are possible.

When a vehicle 25 is being auctioned, information about the vehicle 25 (e.g., make, model, mileage, year of manufacture, performance parameters, etc.) and/or images of the vehicle 25 may be displayed by the display device 83. In some embodiments, as shown by FIG. 5, the display device 83 may be coupled to and controlled by the controller 71. The input received by the user input device 77 to commence rotation of the vehicle 25 may be used by the controller 71 to control the information displayed by the display device 83. For example, in response to such input, in addition to commencing rotation of the bay's turntable 22, the controller 71 may also transition to displaying via the display device 83 information about the next vehicle 25 to be auctioned, which should now be on the turntable 22 that is being rotated. That is, the controller 71 treats the user input as a trigger not just to begin turning the vehicle 25 being auctioned but also as a trigger to initiate display of information pertaining to such vehicle 25. This may help to facilitate coordination of the auction so that a user can provide a single input to begin movement of the turntable 22 and display of information about the vehicle 25 on the turntable 22 to help reduce burdens on the user while also ensuring that the information being displayed by the display device 83 is timely updated as the auctions progress. In other embodiments, other techniques for controlling the information displayed by the display device 83 are possible. As an example, it is possible for the display device 83 to be controlled by a controller (not shown) separate from the controller 71.

As shown by FIG. 1, the auction bays 15 and, thus, turntables 22 are arranged in a curved pattern (e.g., a semicircle). Such a curved arrangement provides various advantages. For example, the curved arrangement allows bidders in the bidding area 33 to see all the vehicles 25 on all the turntables 22 from the same viewing location. Thus, the bidders can keep better track of when vehicles 25 of interest are being auctioned at multiple auction bays 15, and it is unnecessary for the bidders to run or otherwise move from one bay 15 to another just to see whether a vehicle 25 of interest is being auctioned. In addition, the curved arrangement of the auction bays 15 also helps to conserve space so that the facility 10 of a given size can make more vehicles 15 available for auction at the same time.

An example use of an auction bay 15 to auction a plurality of vehicles 25 will now be described with particular reference to FIGS. 6A-6G.

Figure 6A:
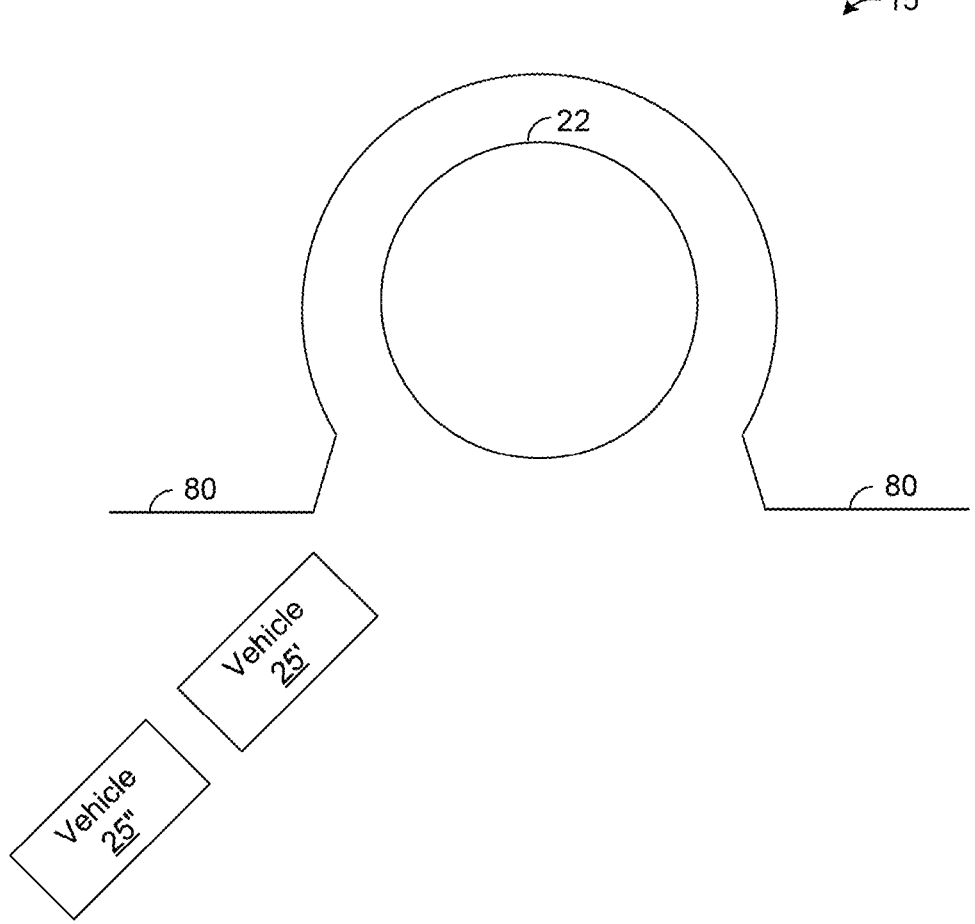
FIG. 6A is a top view of an auction bay before vehicles from a line of vehicles are driven into the bay for auctioning.
Figure 6B:
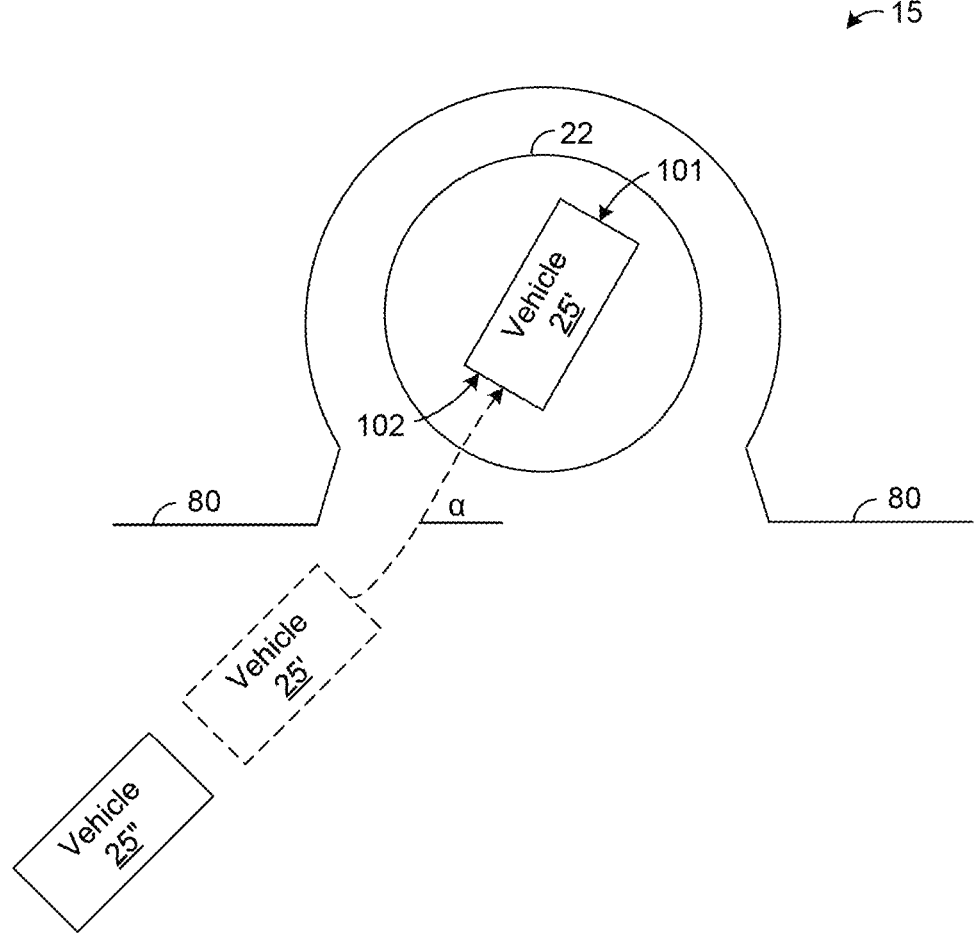
FIG. 6B is a top view of the auction bay of FIG. 6A after a vehicle in the line of vehicles has driven into the auction bay and is positioned on a turntable before rotation.
Figure 6C:
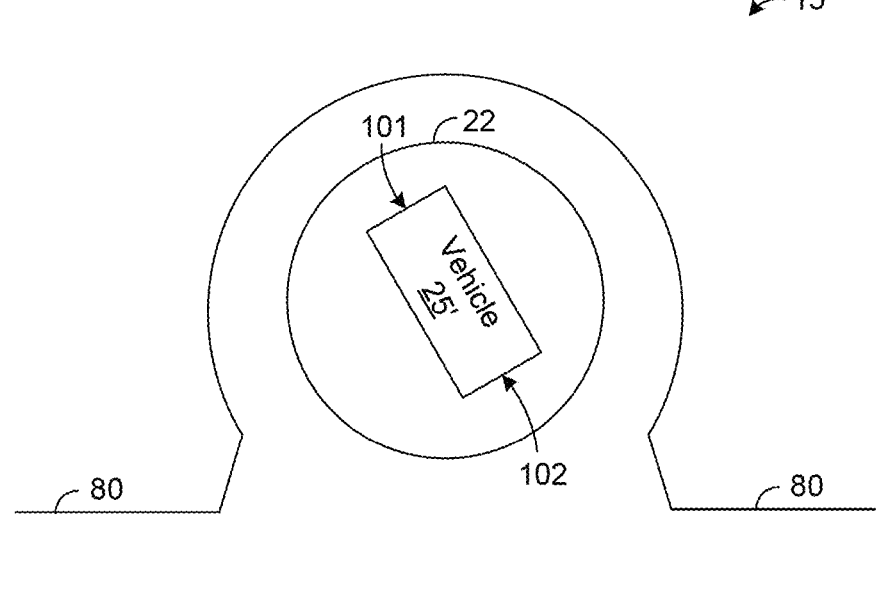
FIG. 6C is a top view of the auction bay of FIG. 6B after the vehicle in the auction bay has been rotated counterclockwise.
Figure 6C:
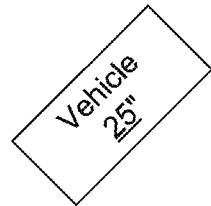
Figure 6D:
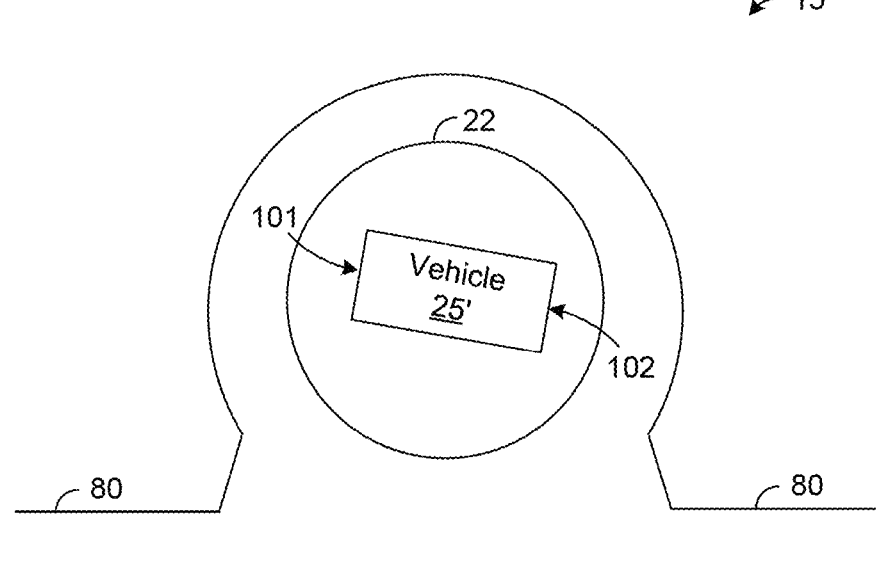
FIG. 6D is a top view of the auction bay of FIG. 6C after the vehicle in the auction bay has been further rotated counterclockwise.
Figure 6E:
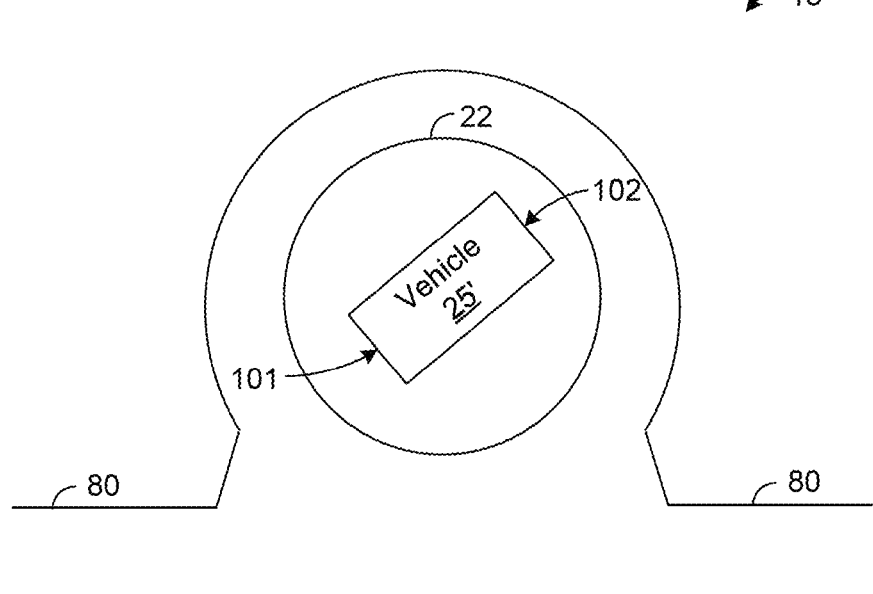
FIG. 6E is a top view of the auction bay of FIG. 6D after the vehicle in the auction bay has been further rotated counterclockwise.
Figure 6E:
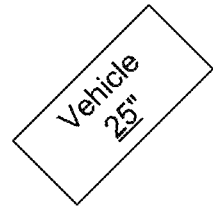

As shown by FIG. 6A, a line of vehicles 25 to be auctioned in a given auction bay 15 may be located outside of the facility 10. For simplicity of illustration, FIG. 6A shows two vehicles 25', 25" in a line for the auction bay 15, but the line may have any number of vehicles 25 in other embodiments. In general, each vehicle 25', 25" may be positioned in substantially the same direction so that the vehicle 25', 25" enters the facility 10 at an angle (α) of about 40 to 60 degrees (relative to a threshold of the doorway 18) if the vehicle 25', 25" is driven substantially straight into the bay 15, as shown by FIG. 6B. In FIG. 6B, a front 101 of the vehicle 25' faces bidders in the bidding area 33 who can see the front and at least one side of the vehicle 25', and a back 102 of the vehicle 25' faces out of the bay 15 through the doorway 18.

Figure 6F:
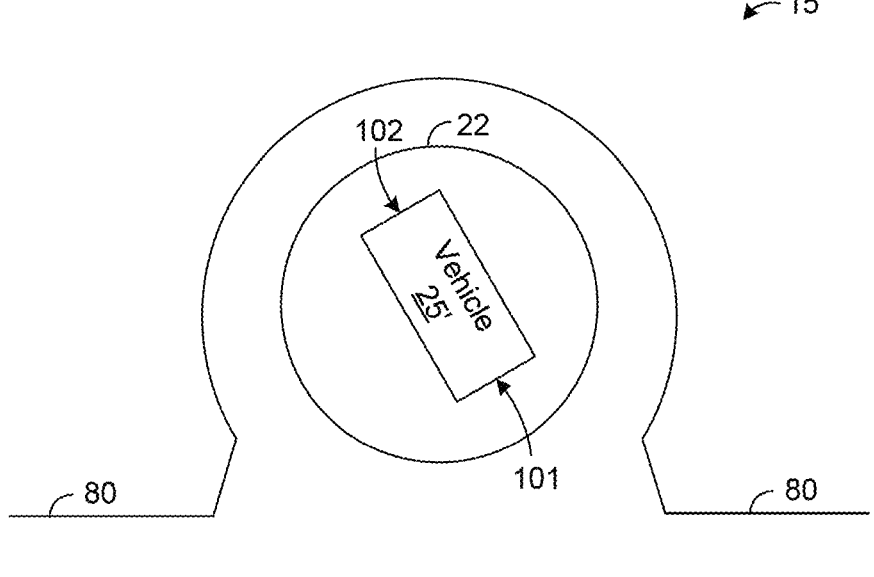
FIG. 6F is a top view of the auction bay of FIG. 6B after the vehicle in the auction bay has been fully rotated, and the turntable is stopped so that the vehicle may exit the auction bay.
Figure 6G:
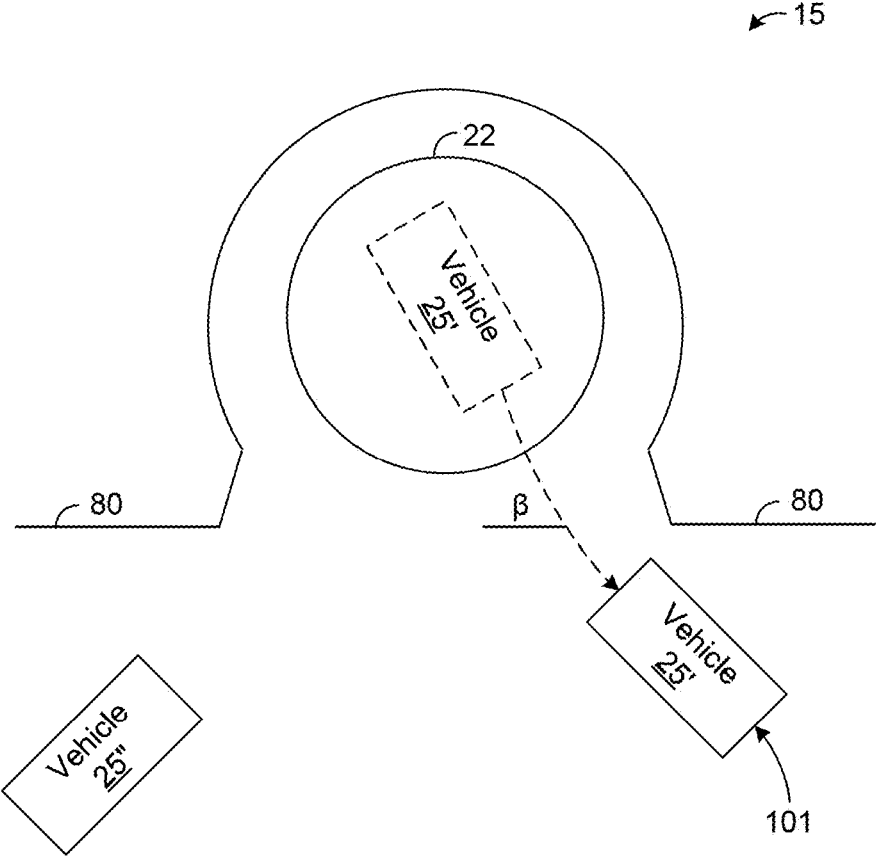
FIG. 6G is a top view of the auction bay of FIG. 6F after the vehicle has exited the auction bay.
Figure 7A:
FIG. 7A is a side view of the auction bay of FIG. 6C.
Figure 7B:
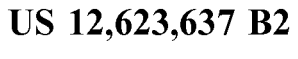
FIG. 7B is a side view of the auction bay of FIG. 6D.
Figure 7C:
FIG. 7C is a side view of the auction bay of FIG. 6E.
Figure 7D:
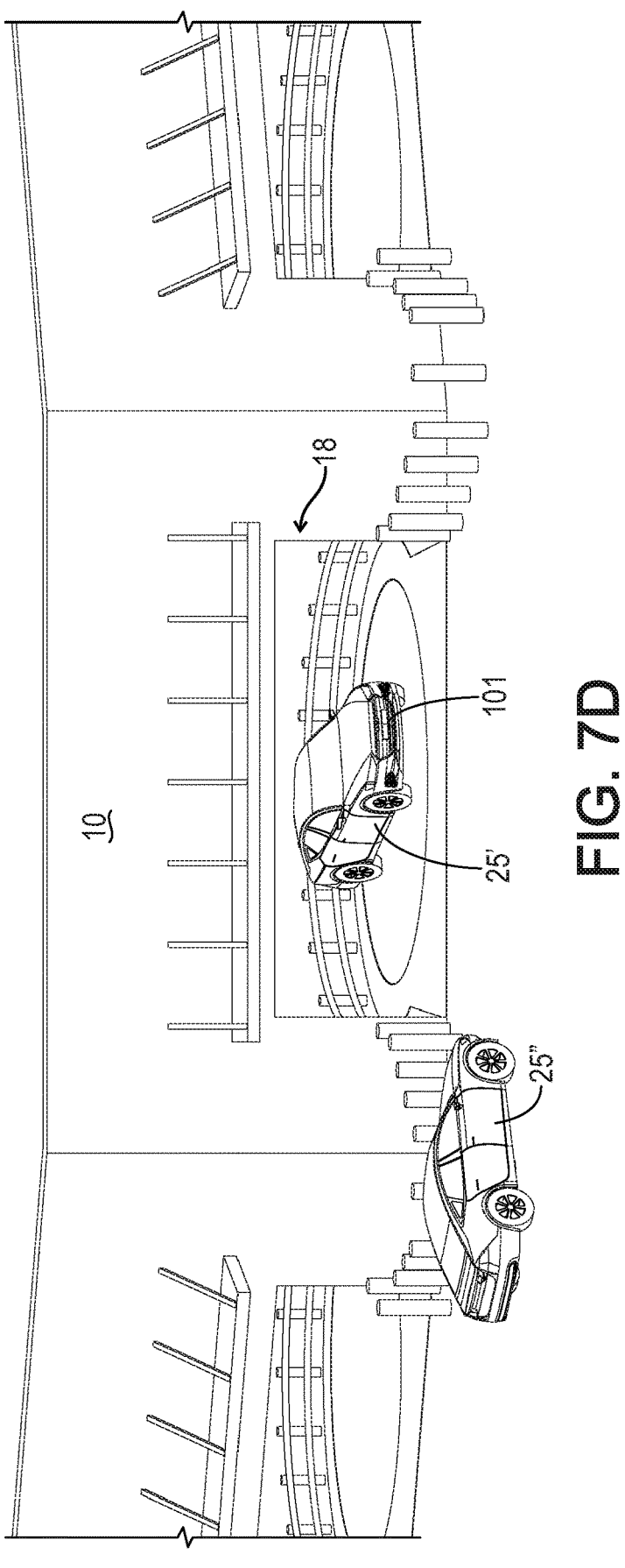
FIG. 7D is a side view of the auction bay of FIG. 6F.
Figure 7E:
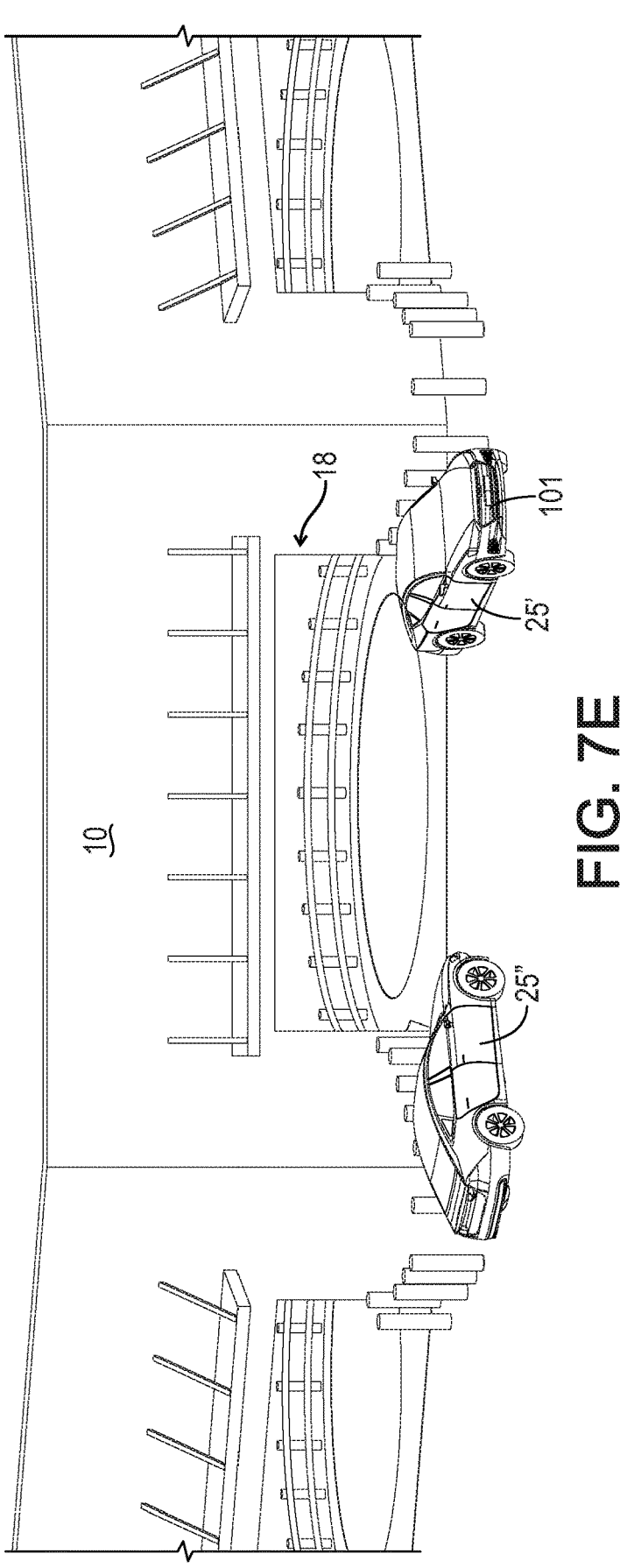
FIG. 7E is a side view of the auction bay of FIG. 6G.

Once a user provides an input for commencing rotation of the turntable 22, the turntable 22 rotates the vehicle 25' counterclockwise greater than 180 degrees (e.g., about 240 degrees), as shown by FIGS. 6B-6F and FIGS. 7A-7D. FIGS. 6F and 7D show the position of the vehicle 25' once the turntable 22 has stopped rotating for the current auction. At this point, the vehicle 25' is positioned so that it can exit the bay 15 at an angle (B) of about 40 to 60 degrees (relative to the threshold of the doorway 18) if the vehicle 25' is driven straight out of the doorway 18, as shown by FIG. 6G. Further, the vehicle 25' is positioned so that it can drive off the turntable 22 in a direction away from the next vehicle 25" to be auctioned. Thus, as the auctioned vehicle 25' is driving out of the bay 15 and facility 10 or immediately thereafter, the next vehicle 25" to be auctioned may begin driving into the bay 15, thereby minimizing the amount of time required to move (1) the auctioned vehicle 25' off the turntable 22 and out the bay 15 and (2) the next vehicle 25" into the bay 15 and onto the turntable 22. Not only is the time required between auctions reduced, but the vehicles 25', 25" are also able to exit and enter the bay 15 safely with minimal risk of collision with each other, a wall of the facility 10, or a bidder.

Now, therefore, the following is claimed:

1. A system for displaying vehicles for auctions, comprising:
   a plurality of auction bays of a facility, each of the auction bays having a turntable on which a vehicle may be positioned for auctioning, wherein the turntable is configured to rotate, thereby rotating the vehicle during an auction of the vehicle, wherein each auction bay has a doorway through which vehicles may enter and exit the respective auction bay, and wherein the plurality of auction bays is arranged in a curved fashion; and
   at least one controller for controlling the turntable.

2. The system of claim 1, wherein the at least one controller is configured to control the turntable to rotate the vehicle by an angle greater than 180 degrees.

3. The system of claim 1, wherein the at least one controller is configured to control the turntable to rotate the vehicle by an angle between 230 degrees and 250 degrees.

4. The system of claim 1, wherein each of the auction bays has an auction block.

5. The system of claim 1, further comprising a user input device configured to receive a user input, wherein the at least one controller is configured to commence rotation of the turntable for an auction in response to the user input.

6. The system of claim 5, wherein the at least one controller is configured to rotate the turntable by a predefined angle in response to the user input.

7. The system of claim 6, wherein the at least one controller is configured to control a display device in response to the user input such that the display device begins to display information pertaining to a vehicle on the turntable for the auction.

8. The system of claim 6, wherein the user input device comprises a button for receiving the user input.

9. The system of claim 1, wherein at least one of the auction bays has a barrier that separates the turntable from a bidding area in which bidders for bidding on the vehicle are located.

10. The system of claim 9, wherein each vehicle of a plurality of vehicles simultaneously in each of the auction bays is visible to a bidder in the bidding area.

11. The system of claim 9, wherein the barrier has a bollard extending from a floor of the facility, and wherein the barrier has a guardrail mounted on the bollard.

12. A method for displaying vehicles for auctions, comprising:

positioning a plurality of vehicles in auction bays of a facility, each of the auction bays having a turntable on which a respective one of the plurality of vehicles is positioned, wherein the plurality of auction bays includes at least a first auction bay having a first turntable on which a first vehicle of the plurality of vehicles is positioned, a second auction bay having a second turntable on which a second vehicle of the plurality of vehicles is positioned, and a third auction bay having a third turntable on which a third vehicle of the plurality of vehicles is positioned, and wherein the positioning comprises driving the first vehicle through a first doorway of the facility for the first auction bay, driving the second vehicle through a second doorway of the facility for the second auction bay, and driving the third vehicle through a third doorway of the facility for the third auction bay;

rotating the first turntable with at least one controller, thereby rotating the first vehicle, during an auction of the first vehicle;

rotating the second turntable with the at least one controller, thereby rotating the second vehicle, during an auction of the second vehicle;

rotating the third turntable with the at least one controller, thereby rotating the third vehicle, during an auction of the third vehicle;

driving the first vehicle out of the first auction bay through the first doorway;

driving the second vehicle out of the second auction bay through the second doorway; and driving the third vehicle out of the third auction bay through the third doorway, wherein the plurality of auction bays is arranged in a curved fashion.

13. The method of claim 12, wherein the at least one controller includes a first controller, a second controller, and a third controller, and wherein the method further comprises:

controlling rotation of the first turntable with the first controller;

controlling rotation of the second turntable with the second controller; and controlling rotation of the third turntable with the third controller.

14. The method of claim 12, wherein the rotating the first turntable comprises rotating the first turntable by an angle greater than 180 degrees.

15. The method of claim 12, wherein rotating the first turntable comprises rotating the first turntable by an angle between 230 degrees and 250 degrees.

16. The method of claim 12, further comprising receiving a user input with a user input device, wherein the rotating the first turntable is performed in response to the receiving the user input.

17. The method of claim 16, wherein the rotating the first turntable comprises rotating the first turntable by a predefined angle in response to the user input.

18. The method of claim 16, further comprising initiating display on a display device of information pertaining to the first vehicle in response to the user input.

19. The method of claim 17, wherein the user input device comprises a button for receiving the user input.

20. The method of claim 12, wherein the first auction bay has a barrier that separates the first turntable from a bidding area in which bidders are located.

21. The method of claim 20, wherein each of the plurality of vehicles is simultaneously positioned in a respective one of the auction bays and is visible to a bidder in the bidding area.

22. The method of claim 20, wherein the barrier has a bollard extending from a floor of the facility, and wherein the barrier has a guardrail mounted on the bollard.

23. The method of claim 12, further comprising forming a line of vehicles to enter the first auctioning area through the first doorway.

* * * * *